(12) United States Patent
Hegdahl et al.

(10) Patent No.: US 10,576,490 B2
(45) Date of Patent: Mar. 3, 2020

(54) SPRAY GUN CUPS, RECEPTACLES, AND METHODS OF USE

(71) Applicant: 3M INNOVATIVE PROPERTIES COMPANY, St. Paul, MN (US)

(72) Inventors: Anna M. Hegdahl, Brooklyn Park, MN (US); Stephen C. P. Joseph, Woodbury, MN (US); Dominic M. Pitera, San Francisco, CA (US); Eric O. Nyaribo, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 189 days.

(21) Appl. No.: 15/736,469

(22) PCT Filed: Jul. 7, 2016

(86) PCT No.: PCT/US2016/041297
§ 371 (c)(1),
(2) Date: Dec. 14, 2017

(87) PCT Pub. No.: WO2017/007911
PCT Pub. Date: Jan. 12, 2017

(65) Prior Publication Data
US 2018/0185869 A1 Jul. 5, 2018

Related U.S. Application Data

(60) Provisional application No. 62/189,954, filed on Jul. 8, 2015.

(51) Int. Cl.
*B05B 15/60* (2018.01)
*B05B 7/24* (2006.01)
(Continued)

(52) U.S. Cl.
CPC ............ *B05B 15/60* (2018.02); *B05B 7/2408* (2013.01); *B05B 7/2478* (2013.01); *G01F 23/02* (2013.01);
(Continued)

(58) Field of Classification Search
CPC ..... B05B 15/60; B05B 7/2478; B05B 7/2408; B05B 7/2481; B05B 9/0838; B05B 9/0855; G01F 23/02; B44D 3/14
See application file for complete search history.

(56) References Cited

U.S. PATENT DOCUMENTS 3,157,360 A * 11/1964 Heard ................... B05B 7/2435
239/354
4,174,071 A * 11/1979 Lau ......................... B05B 15/00
239/348
(Continued)

FOREIGN PATENT DOCUMENTS

| CA | 2466801 | 12/2004 |
|---|---|---|
| DE | 20202123 | 3/2003 |

(Continued)

OTHER PUBLICATIONS

Graco, "CanConnect-Handheld 1 Quart Can Adapter," Feb. 2014, 2 pgs.

(Continued)

*Primary Examiner* — Nicolas A Arnett

(57) ABSTRACT

A spray gun cup receptacle is disclosed comprising an open end for receiving a liner within a cavity and a base end opposite the open end. The base end is positionable with respect to a work surface with the open end facing upwards such that a base plane passing through the base end is parallel to the work surface. A sidewall surrounds the cavity and connects the open end to the base end. The sidewall comprises two apertures through which the cavity is visible from outside the spray gun cup receptacle. The two apertures (Continued)

are divided one above the other by a brace member, at least a portion of which is disposed at a brace member angle α relative to the base plane.

20 Claims, 13 Drawing Sheets

(51) Int. Cl.
  *G01F 23/02* (2006.01)
  *B05B 9/08* (2006.01)
  *B44D 3/14* (2006.01)
(52) U.S. Cl.
  CPC ........... *B05B 7/2481* (2013.01); *B05B 9/0838* (2013.01); *B44D 3/14* (2013.01)

(56) References Cited

U.S. PATENT DOCUMENTS

| | | | |
|---|---|---|---|
| 4,858,777 A | 8/1989 | Morel | |
| 5,611,443 A | 3/1997 | King | |
| 6,375,031 B1 | 4/2002 | Kwan | |
| 6,536,687 B1 | 3/2003 | Navis | |
| 6,588,681 B2 * | 7/2003 | Rothrum | B01F 15/0491 239/328 |
| 6,796,514 B1 * | 9/2004 | Schwartz | B05B 7/2478 239/345 |
| 6,820,824 B1 * | 11/2004 | Joseph | B05B 7/2408 239/346 |
| 7,188,785 B2 | 3/2007 | Joseph | |
| 7,344,040 B2 * | 3/2008 | Kosmyna | B05B 7/2408 220/23.87 |
| 7,845,582 B2 * | 12/2010 | Joseph | B05B 7/2408 137/843 |
| 8,033,413 B2 * | 10/2011 | Gerson | B05B 7/2408 220/315 |
| 8,127,963 B2 * | 3/2012 | Gerson | B05B 7/2408 220/495.02 |
| 8,444,067 B2 | 5/2013 | Schmon | |
| 8,647,574 B2 * | 2/2014 | Halverson | G01N 1/38 210/516 |
| 8,857,649 B2 | 10/2014 | Buchholz | |
| 8,998,018 B2 * | 4/2015 | Pellegrino | B05B 7/2408 220/495.05 |
| 9,174,231 B2 | 11/2015 | Shultz | |
| 9,352,343 B2 * | 5/2016 | Bierie | B05B 7/2478 |
| 9,796,492 B2 * | 10/2017 | Luczak | B05B 3/006 |
| 9,802,211 B2 * | 10/2017 | Joseph | B05B 7/02 |
| 9,802,213 B2 * | 10/2017 | Joseph | B05B 7/066 |
| 2003/0198502 A1 | 10/2003 | Maloney | |
| 2004/0256484 A1 | 12/2004 | Joseph | |
| 2005/0092770 A1 | 5/2005 | Yechouron | |
| 2005/0139621 A1 | 6/2005 | Foster | |
| 2010/0288772 A1 * | 11/2010 | Wambeke | B05B 7/2408 220/373 |
| 2010/0288787 A1 | 11/2010 | Jäckel | |
| 2012/0282009 A1 | 11/2012 | Geuther | |
| 2013/0221130 A1 | 8/2013 | Joseph | |
| 2015/0108135 A1 | 4/2015 | Hanna | |
| 2017/0203887 A1 | 7/2017 | Hegdahl | |
| 2019/0009289 A1 * | 1/2019 | Pitera | B05B 7/2478 |
| 2019/0009290 A1 * | 1/2019 | Hegdahl | B05B 7/2478 |

FOREIGN PATENT DOCUMENTS

| | | |
|---|---|---|
| DE | 202004003116 | 8/2005 |
| EP | 2203256 | 7/2010 |
| NL | 1033999 | 2/2009 |
| WO | WO 1998-32539 | 7/1998 |
| WO | WO 2002-085533 | 10/2002 |
| WO | WO 2005-018815 | 3/2005 |
| WO | WO 2013-063231 | 5/2013 |
| WO | WO 2014-182871 | 11/2014 |
| WO | WO 2017-007911 | 1/2017 |
| WO | WO 2017-123714 | 7/2017 |
| WO | WO 2017-123715 | 7/2017 |
| WO | WO 2017-123718 | 7/2017 |

OTHER PUBLICATIONS

Graco, "XFORCE HD, Heavy Duty Cordless Airless Sprayer Optimized for Protective and Marine Coatings", 2012, 4 pgs.

Kenna, "Eccentricity in Ellipses", Mathematics Magazine, Jan.-Feb. 1959, vol. 32, No. 3, pp. 133-135.

Rummy Recycling Technologies Inc., "Paint & Solvent Solutions" brochure with price list, 2004.

International Search Report for PCT International Application No. PCT/US2017/013120, dated Jun. 13, 2017, 6 pages.

* cited by examiner

SPRAY GUN CUPS, RECEPTACLES, AND METHODS OF USE

CROSS REFERENCE TO RELATED APPLICATIONS

This application is a national stage filing under 35 U.S.C. 371 of PCT/US2016/041297, filed Jul. 7, 2016, which claims the benefit of U.S. Provisional Application No. 62/189,954, filed Jul. 8, 2015, the disclosures of which are incorporated by reference in their entireties herein.

BACKGROUND

Liquid spray guns are commonly used to spray coatings such as stains, primers, paints, sealers and the like onto surfaces. It is known to provide a liquid spray gun with a paint cup that contains the liquid to be sprayed. There is a need for improved paint cups, components thereof, and methods for using the same.

SUMMARY

It has been observed that paint cups and their components have a tendency to become coated in paint when used in their typical environments (e.g., in the mixing room of an automotive collision repair shop). This coating of paint can present practical difficulties for the painter. For example, even though a paint cup may be transparent when purchased (in order to permit viewing of the contents of the cup), viewing the contents is eventually made difficult or impossible due to the build-up of dried paint. In particular, in order to facilitate mixing of the correct measurements of components of the paint or other substances, transparent paint cup systems often include a mix ratio gauge that is visible from the exterior of the cup. The mix ratio gauge may be a separate insert, or it may be displayed on the paint cup itself. To combat the buildup of paint and maintain visibility of the mix ratio gauge, a painter is required to either use solvent to clean the paint cup, or purchase a new one. If the painter is then forced to purchase a new cup to replace the contaminated one, a significant amount of plastic material may need to be discarded, and the cost of a new cup may be significant.

The present disclosure relates to improved spray gun cups, spray gun cup receptacles, and methods of using the same. In certain embodiments, less material can be used to manufacture the spray gun cup receptacle, thereby leading to a spray gun cup that is cheaper to manufacture, is lighter in use, and creates less waste upon disposal. Spray gun cup receptacles according to the present disclosure can also permit increased visibility of the contents of the spray gun cup through their sidewall, due to the provision of apertures therein. This can be particularly beneficial during paint mixing, when the painter may wish to view the levels of the various liquids added to the spray gun cup to ensure the proper volumes and/or ratios of components are used. Because the apertures cannot become coated with paint, the contents of the spray gun cup can continue to be easily viewed even if the remainder of the sidewalls become coated with paint.

Moreover, due to the nature and placement of a brace member in the sidewall of the spray gun cup receptacle, the brace member leaves a sufficient portion of the apertures non-occluded, such that the contents of the spray gun cup are visible at every height at from at least one viewing direction. In other words, if a painter wishes to ensure that the level of liquid in the spray gun cup is at a certain height, wherein that height is blocked from view by the brace member in one rotational position, the painter need only rotate the spray gun cup—or view the spray gun cup from another direction—until that height becomes visible. In this way, the painter can determine the precise liquid level of contents at any height, regardless of the opacity of the spray gun cup receptacle.

A spray gun cup receptacle according to some embodiments of the present disclosure can provide strength, rigidity, and structure during paint mixing. In some embodiments, the spray gun cup receptacle is left in place while spraying. In such embodiments, the spray gun cup receptacle can also provide strength, rigidity, and structure when connecting the spray gun cup to a spray gun, and in the painting processes itself. These benefits can be achieved while reducing the amount of raw material required for manufacture (as compared to a paint cup with a continuous wall).

In some embodiments, a spray gun cup may include a liner that can be inserted into the spray gun cup receptacle. In such cases, the spray gun cup receptacle may serve as an outer support cup.

In some embodiments, a spray gun cup may comprise a lid member that may optionally include an integrated filter. An integrated filter can eliminate the need for a separate filter by allowing a user to mix the paint within the paint cup itself (i.e., there is no need to transfer paint from another receptacle). Because the number of transfer steps is reduced, the amount of paint wasted is reduced. Examples of lid members and liners suitable for use in some embodiments of the present disclosure can be found in PCT Publication WO 1998/032539 to Joseph et al. (alternatively US Publication US 2004/0256484 A1, the disclosure of which is hereby incorporated by reference in its entirety).

Spray gun cups and spray gun cup receptacles according to the present disclosure can provide the necessary structure to withstand all typical forces in the use of the paint spray system. In the event that a portion of the spray gun cup receptacle blocks a the view of a portion of its contents, the receptacle, the liner, or the mix ratio gauge (where provided) may be rotated or otherwise adjusted to reveal any portion of the contents that was previously concealed by the spray gun cup receptacle. Visibility of the contents, while maintaining sufficient strength, rigidity, and structure as required throughout the mixing, connecting, and painting processes, are thus ensured.

The present disclosure includes, but is not limited to, the following exemplary embodiments:

Embodiment 1

A spray gun cup receptacle comprising
an open end for receiving a liner within a cavity;
a base end opposite the open end, the base end being positionable with respect to a work surface W with the open end facing upwards such that a base plane passing through the base end is parallel to the work surface;
a sidewall surrounding the cavity and connecting the open end to the base end, the sidewall comprising two apertures through which the cavity is visible from outside the spray gun cup receptacle, the two apertures being divided one above the other by a brace member, at least a portion of which is disposed at a brace member angle $\alpha$ relative to the base plane.

Embodiment 2

The spray gun cup receptacle of Embodiment 1 wherein the brace member angle $\alpha$ is sufficient to render the cavity visible through at least one of the two apertures at any vertical position within the cavity.

Embodiment 3

The spray gun cup receptacle of any of Embodiments 1 or 2 wherein the brace member defines a brace member trajectory T about the cavity, the brace member trajectory comprising a non-circular ellipse.

Embodiment 4

The spray gun cup receptacle of any of Embodiments 1-3 wherein the brace member angle $\alpha$ is at least 2 degrees.

Embodiment 5

The spray gun cup receptacle of any of Embodiments 1-4 wherein the brace member angle $\alpha$ is less than or equal to 30 degrees.

Embodiment 6

The spray gun cup receptacle of any of Embodiments 1-5 wherein the open end comprises receptacle connection structure to permit a lid member to be secured to the open end.

Embodiment 7

The spray gun cup receptacle of any of Embodiments 1-5 wherein the receptacle connection structure permits the lid member to be secured by one of: a threaded connection, a helical wedge connection, a snap-fit connection, a push-fit connection, a twist-lock connection, a clip connection, a strap connection, or combinations thereof.

Embodiment 8

The spray gun cup receptacle of any of Embodiments 1-7 wherein the sidewall comprises one or more generally vertical support members intersecting the brace member.

Embodiment 9

A spray gun cup comprising
a spray gun cup receptacle according to any of Embodiments 1-8; and
a liner positioned in the cavity, the liner comprising an open end corresponding to the open end of the spray gun cup receptacle.

Embodiment 10

The spray gun cup of Embodiment 9 comprising volumetric indicia V position to be visible through the apertures and indicate a volume of contents of the liner.

Embodiment 11

The spray gun cup of Embodiment 10 wherein the volumetric indicia are on the liner.

Embodiment 12

The spray gun cup of Embodiment 10 wherein the volumetric indicia are provided on an insert positioned between the spray gun cup receptacle and the liner.

Embodiment 13

The spray gun cup container of any of Embodiments 9-12 comprising a lid member secured to the open end of the spray gun cup receptacle.

Embodiment 14

The spray gun cup container of Embodiment 13 wherein the open end of the liner is secured by interaction of the lid member and the open end of the spray gun cup receptacle.

Embodiment 15

A method of using a spray gun cup comprising
positioning a spray gun cup receptacle according to any of Embodiments 1-8 on a work surface;
inserting a liner into the open end of the spray gun cup receptacle;
adding a liquid to the liner; and
viewing the level of the liquid through an aperture in the sidewall of the spray gun cup receptacle.

Embodiment 16

The method of Embodiment 15 comprising, prior to inserting the liner into the open end of the spray gun cup receptacle, inserting an insert comprising volumetric indicia into the open end of the spray gun cup receptacle.

Embodiment 17

The method of Embodiment 16 comprising determining the volume of the liquid by viewing the volumetric indicia through the aperture.

Embodiment 18

The method according to any of Embodiments 15-17 comprising adding additional liquid to the liner, and viewing the level of the combined liquids through an aperture in the sidewall of the spray gun cup receptacle.

Embodiment 19

The method according to any of Embodiments 15-18 comprising securing a lid to the open end of the spray gun cup receptacle, the lid comprising a liquid outlet.

Embodiment 20

The method of Embodiment 19 comprising attaching the liquid outlet to a spray gun.

These, as well as other aspects, advantages, and alternatives, will become apparent to those of ordinary skill in the art by reading the following detailed description, with reference, where appropriate, to the accompanying drawings.

It should be noted that, for simplicity, the term "paint" is used throughout this specification, but it will be understood that this does not limit the spray gun cup receptacle to use with paint and that the spray gun cup receptacle is suitable for use with all liquids which are suitable for use in a liquid spray gun system.

Additionally, it will be understood that terms such as "top", "bottom", "upper", "lower", "under", "over", "front", "back", "outward", "inward", "up", "down", "first", and "second", which may be used in this disclosure, are used in their relative sense only, unless otherwise noted.

DETAILED DESCRIPTION

It should be noted that in the accompanying figures, some elements may be present in identical or equivalent multiples; in such cases, only one or more representative elements may be designated by a reference number, but it will be understood that such reference numbers apply to all such identical elements.

Figure 1A:
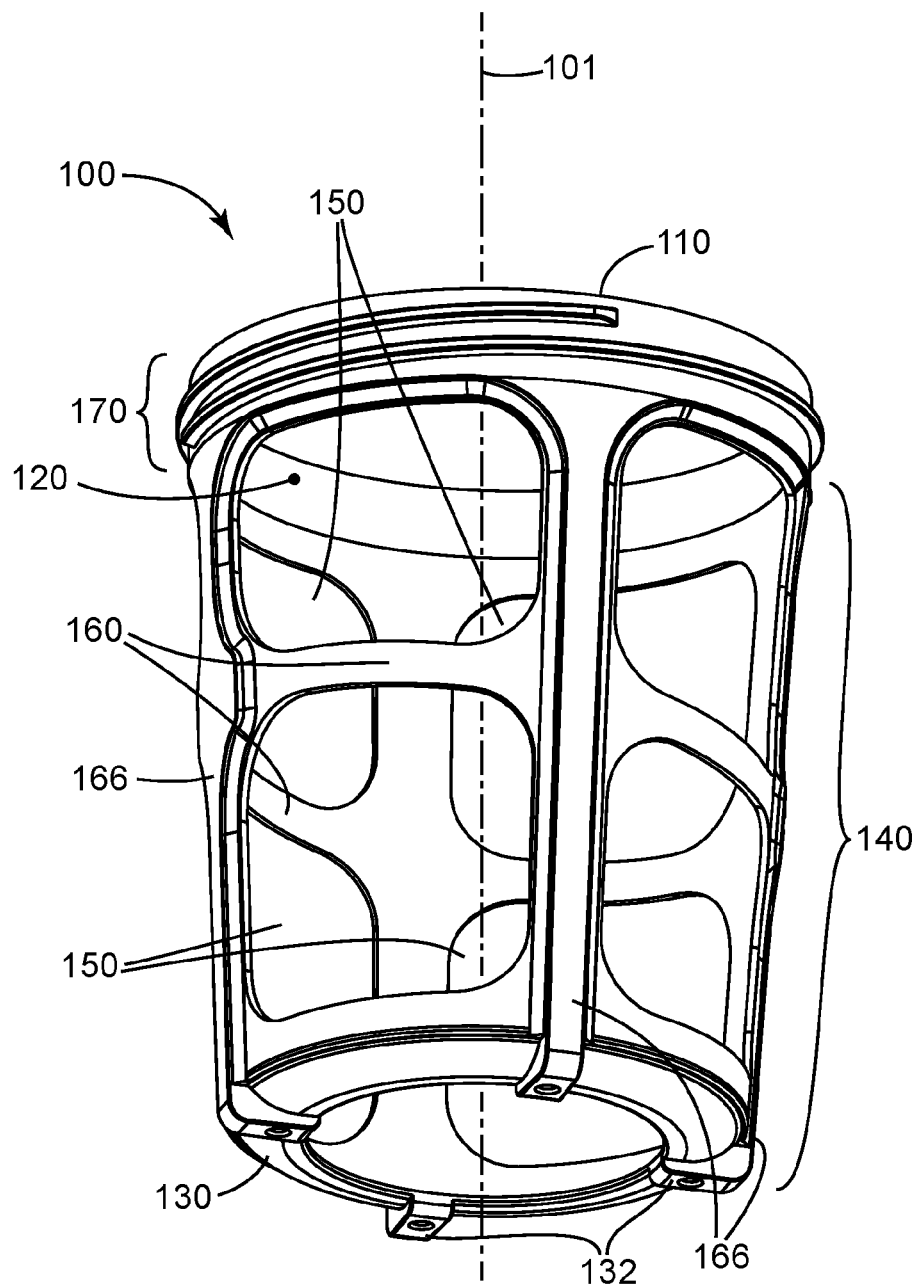
FIG. 1A is an isometric view of an embodiment of a spray gun cup receptacle according to the present disclosure.
Figure 1B:
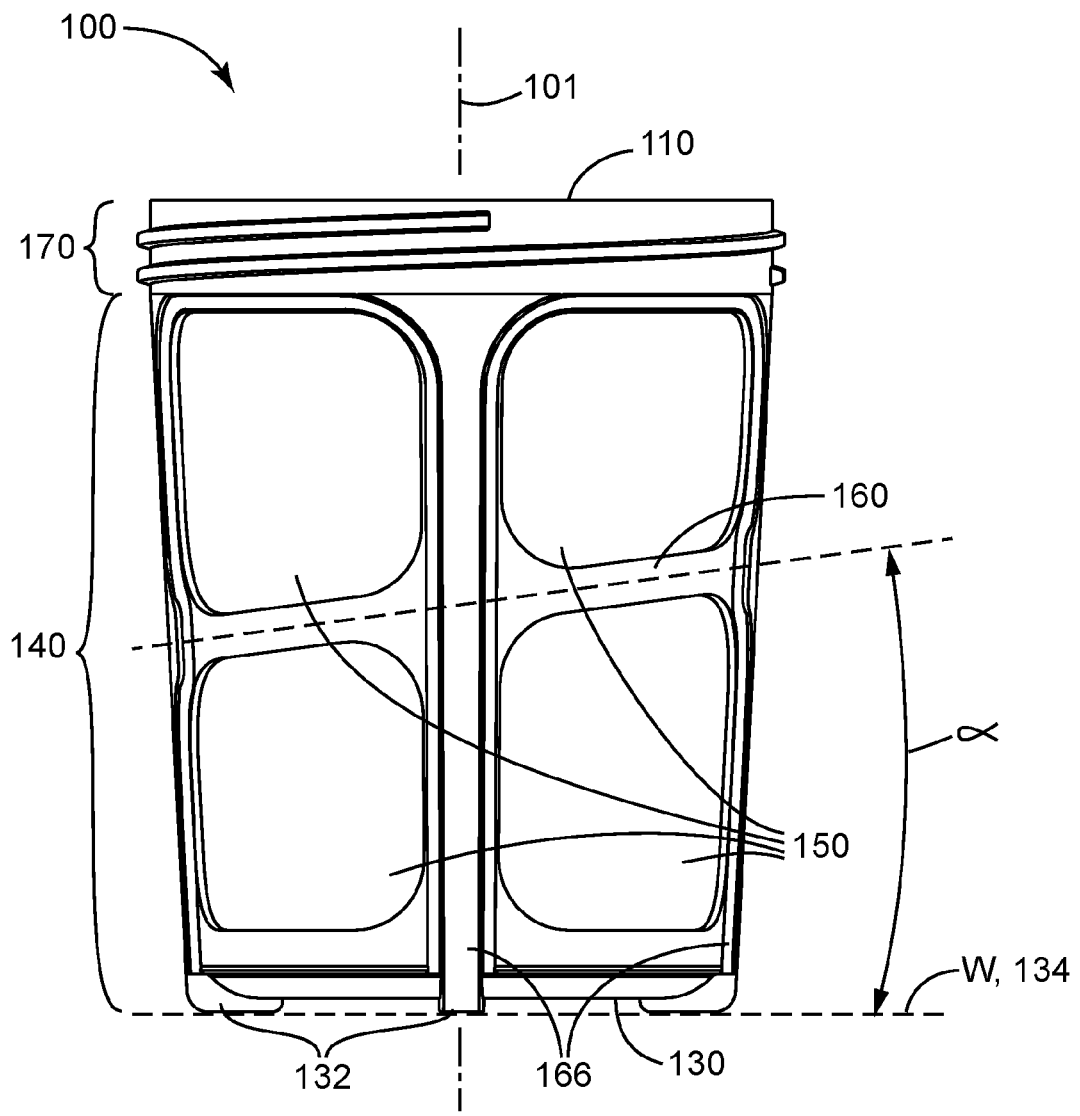
FIG. 1B is a side view of the embodiment of a spray gun cup receptacle presented in FIG. 1A according to the present disclosure.

FIGS. 1A and 1B depict an exemplary embodiment of a spray gun cup receptacle 100 according to the present disclosure. The spray gun cup receptacle 100 comprises an open end 110 providing access to an interior cavity 120. Opposite the open end 110 is a base end 130. As shown, the base end 130 comprises an essentially flat configuration having optional feet 132 enabling the base to be stably rested directly on a flat work surface W (not shown in FIG. 1A). The number, shape, and placement of the feet 132 may be varied as needed. In some embodiments, the base end is not itself flat, but can be held at rest on a work surface as above with the assistance of an additional structure (i.e., a holder or the like).

Whether the base end is flat or not, a base end plane 134 can be drawn through the base end (while at rest and upright as indicated above) parallel to the work surface W, as shown in FIG. 1B.

In this embodiment, a sidewall 140 surrounds the cavity 120 and connects the open end 110 to the base end 130. The sidewall 140 comprises a series of apertures 150 (at least two, but in this particular embodiment eight) that penetrate the sidewall 140 to permit the contents of the cavity 120 to be viewed therethrough. There is no requirement as to how much material is required to constitute a sidewall 140; it is to be understood that a sidewall 140 exists so long as the open end 110 and the base end 130 are connected. As shown, the apertures 150 are divided by a brace member 160 and by support members 166. Generally, the support members 166 provide support in the axial direction (along a central axis 101, and orthogonal to the base end plane 134), while the brace member 160 provides, inter alia, hoop strength to the spray gun cup receptacle 100 at an intermediate position between the open end 110 and the base end 130. In the embodiment shown, there are four vertical support members 166. However, it is envisioned that there could be a different number of support members (e.g., one, two, three, five, six, or seven or more), and that the support members could be non-vertical or only generally vertical. By "generally vertical", it is meant that an imaginary straight line drawn to represent an average of the trajectory of a support member from the base end to the open end is within +/−five degrees of vertical. It should be understood that the term "vertical" as used herein refers to the orientation of geometry assuming the spray gun cup receptacle were resting with a flat base end resting on a level, flat work surface.

In some embodiments, the sidewall 140 spray gun cup receptacle 100 may be highly apertured, such that relatively minimal support structure (e.g., brace member(s) and/or support member(s)) are provided. In such cases, it may be advantageous to construct the spray cup receptacle (particularly the sidewall 140) from a relatively strong material, such as a filled polyamide.

It can further be seen in the embodiment of FIGS. 1A and 1B that the spray gun cup receptacle comprises receptacle connection structure 170 proximate its open end. This receptacle connection structure enables a separate lid member 300 (not shown in FIGS. 1A-1D) to be secured to the spray gun cup receptacle. As shown, the receptacle connection structure 170 comprises threads. However, other connection structures may be employed to provide a different connection mechanism (e.g., a helical wedge connection, a snap-fit connection, a push-fit connection, a twist-lock connection, a clip connection, a latch connection, a hinged connection, or combinations thereof).

Figure 1C:
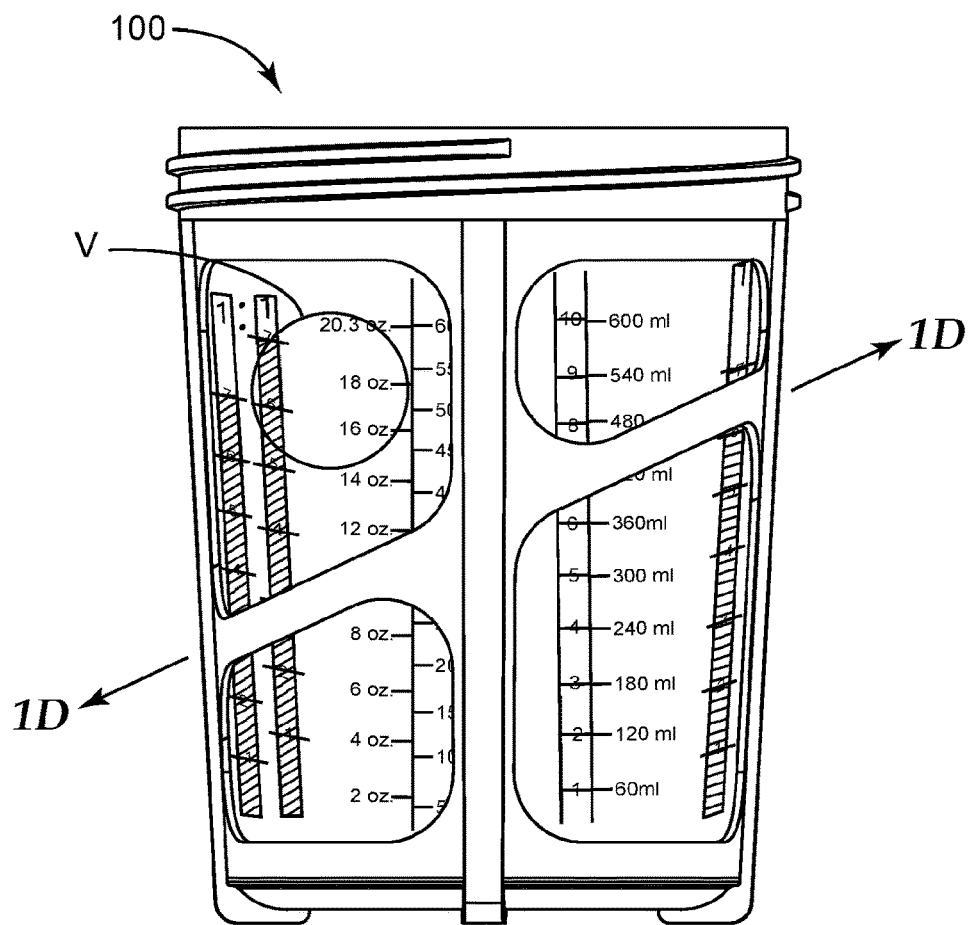
FIG. 1C is a side view of the embodiment of a spray gun cup receptacle including volumetric indicia according to the present disclosure.

Turning now to FIG. 1C, a spray gun cup receptacle 100 similar to those shown in FIGS. 1A and 1B is further provided with volumetric indicia "V." The volumetric indicia provide the painter a way to determine the volume and/or ratio of liquid component(s) in the cavity. The volumetric indicia may be provided as a separate insert (see, e.g., FIGS. 4C and 5C), imprinted or otherwise disposed on a liner, or otherwise positioned between the spray gun cup receptacle and the cavity where liquids may be contained.

As can be seen in FIGS. 1B and 1C, the brace member are disposed at a suitable brace member angle α that permits the volumetric indicia to be viewed at any height within the cavity. For example, although as shown in FIG. 1C the "10 oz." indicia is hidden behind the brace member, a simple rotation of the volumetric indicia would enable it to be viewed (for example, by rotating the volumetric indicia such that "12 oz." would appear in the lower right-hand aperture). Alternatively, or in addition, the volumetric indicia may be repeated such that an identical volume marking appears in more than one location, wherein at least one of the locations is not visually occluded by the brace member. In this way, the disposition of the brace member can permit the volume of the contents to be accurately determined at any liquid level.

In the exemplary embodiments of FIGS. 1A and 1B, the magnitude of the brace member angle α is about 7.5 degrees as referenced from the base end plane 134. In the embodiment of FIG. 1C, (in order to make the below-described trajectory "T" more visually apparent) the magnitude of the brace member angle α is about 25 degrees as referenced from the base end plane 134. However, the brace member angle α (or "angles" in the case of more complex shapes) may be chosen as any angle greater than 0 degrees and less than 90 degrees (i.e., the brace member is neither parallel nor orthogonal to the base end plane) that both facilitates the structural requirements of the spray gun cup receptacle and also provides visibility as described herein at all levels of the cavity through at least one aperture. A brace member 160 should divide at least two apertures such that the apertures are positioned—at least partially—vertically one over the other, and thus brace member angles α much less than 90 degrees (e.g., 30 degrees or less) are expected for most spray gun cup receptacle sizes and geometries. As can be seen in embodiments of the Figures, apertures are divided by brace members disposed at brace member angles α such that an upper aperture is positioned higher than a lower aperture, thereby permitting visibility at all liquid levels.

Figure 2:
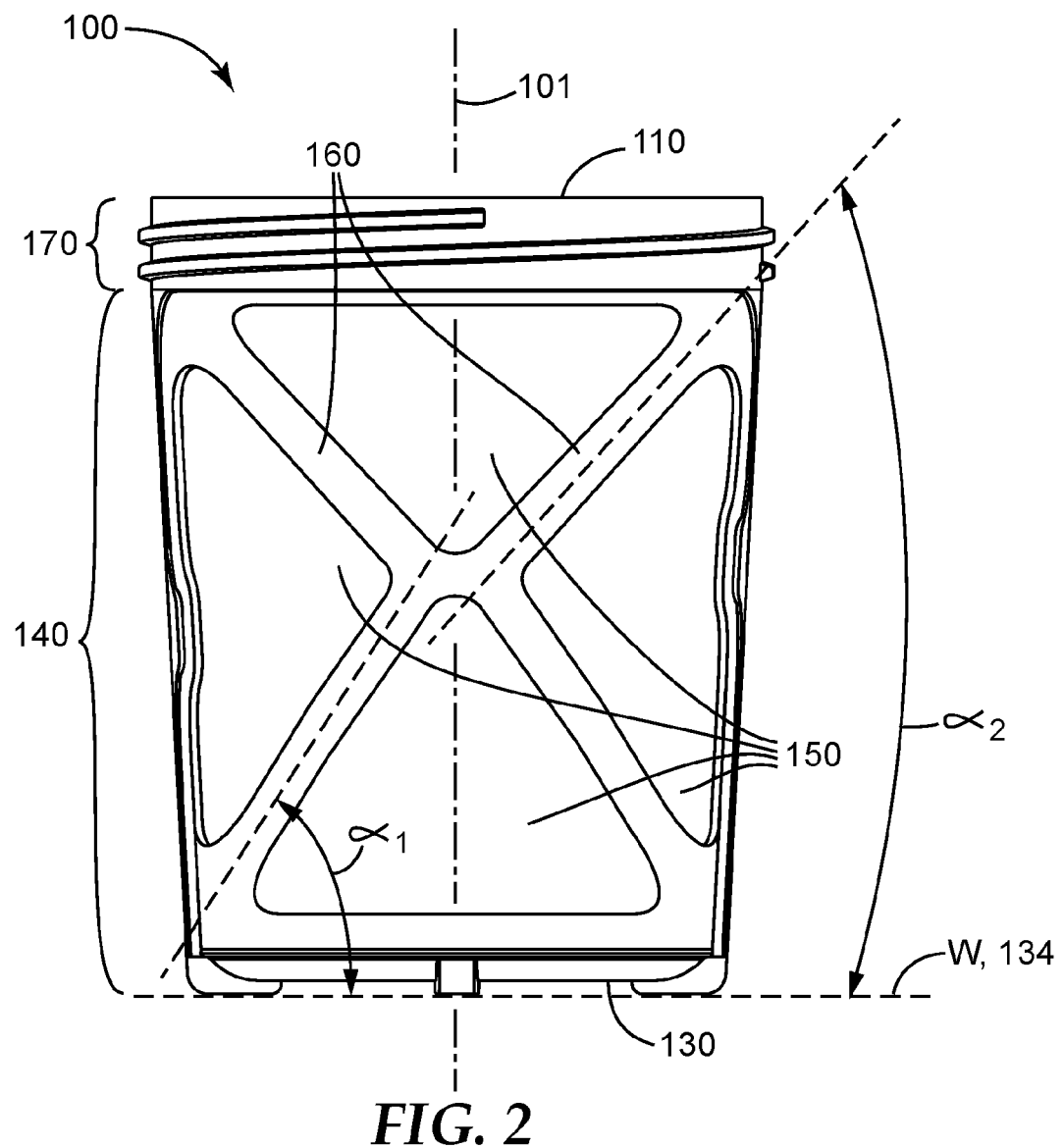
FIG. 2 is a side view of an embodiment of a spray gun cup receptacle according to the present disclosure.
Figure 3:
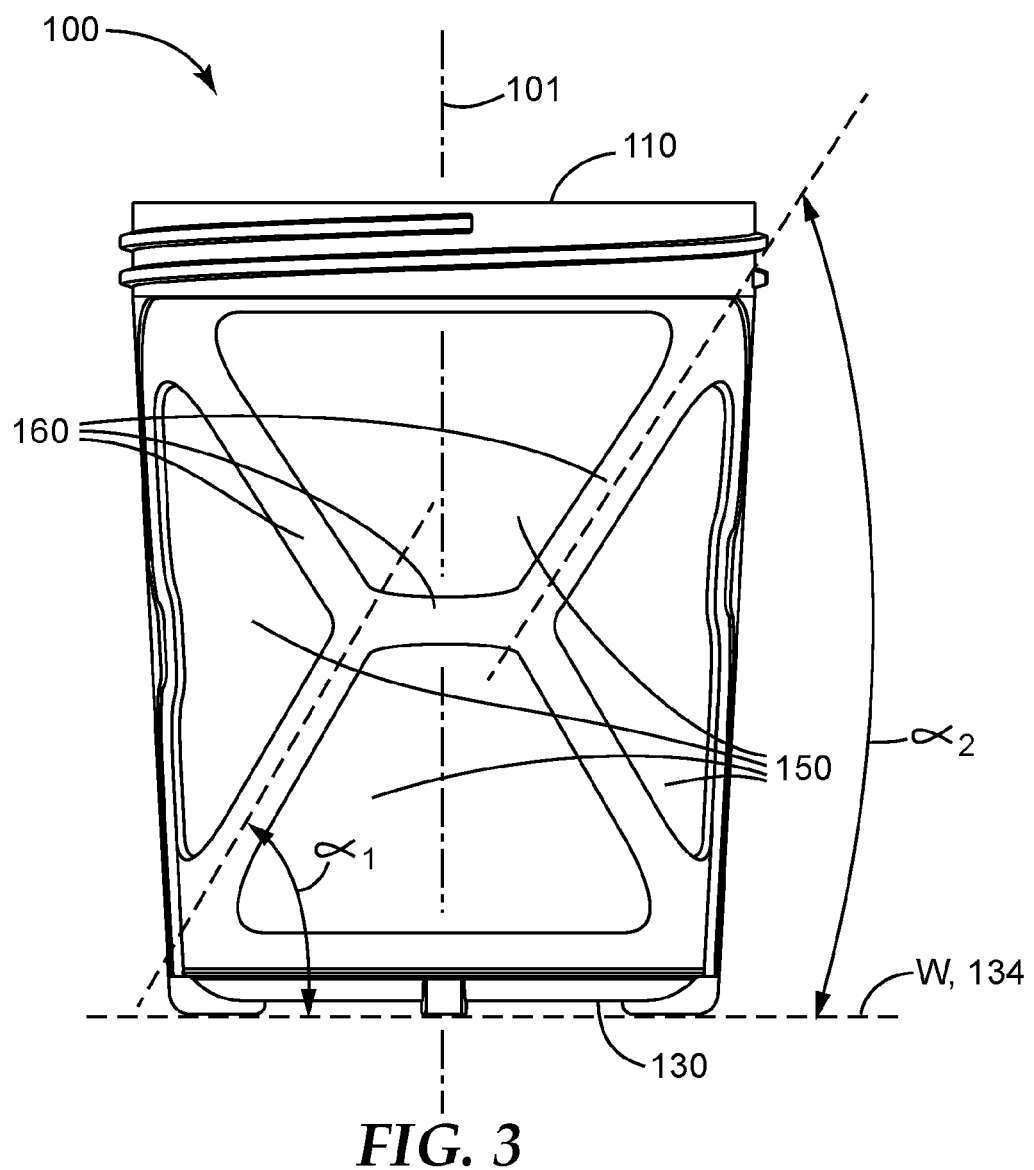
FIG. 3 is a side view of an embodiment of a spray gun cup receptacle according to the present disclosure.

In some embodiments, multiple brace members 160 with different corresponding angles $\alpha_1$, $\alpha_2$, $\alpha_3$, etc. may form more complex shapes (see, e.g., FIGS. 2 and 3). In some embodiments, the brace member angle α is at least about 2 degrees as referenced from the base end plane 134. In some embodiments, the brace member angle α is less than or equal to about 30 degrees as referenced from the base end plane 134. In some embodiments, the brace member angle α is in a range from about 2 degrees to about 30 degrees as referenced from the base end plane 134, including, without limitation, 4, 7, 11.5, 16, and 25 degrees, including any angle therein.

Figure 1D:
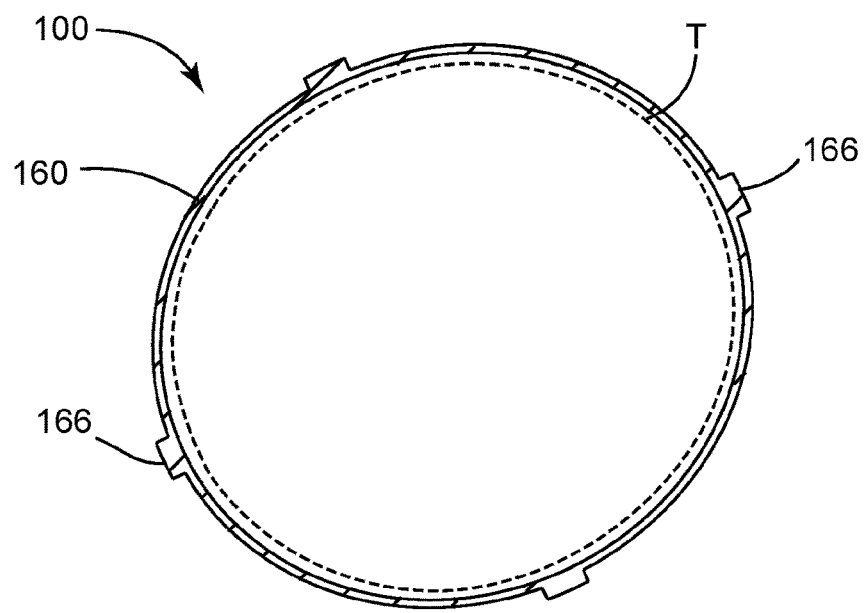
FIG. 1D is a cross-sectional view taken at 1D-1D of FIG. 1C of a spray gun cup receptacle according to the present disclosure.

As shown in the embodiment of FIG. 1D, the trajectory "T" followed by the brace member 160 as it circumscribes the cavity 120 can be described as a non-circular ellipse. As used herein, "non-circular ellipse" means an ellipse whose eccentricity is not zero. In embodiments where the sidewall of the spray gun cup receptacle is generally cylindrical, the eccentricity may be calculated as the sine of the brace member angle α in degrees (i.e., eccentricity=SIN(α)). Generally, for such embodiments, the eccentricity will increase as the brace member angle α increases, and vice-versa. In some embodiments, the eccentricity of the trajectory "T" is at least 0.03. In some embodiments, the eccentricity of the trajectory "T" is less than or equal to 0.5. In some embodiments, the eccentricity of the trajectory "T" is in a range from about 0.03 to about 0.5.

It should be understood that the trajectory "T" need not be strictly elliptical in order to fall within the scope of the present disclosure. For example, the spray gun cup receptacle may be formed as generally cylindrical, but with a slight draft angle (e.g., approximately 3 degrees) such that its profile increases from the base end to the open end, resulting in a trajectory "T" along the brace member angle α that is generally elliptical, but in reality is slightly "egg-shaped."

In other embodiments, the brace member may follow a differing trajectory or trajectories. For example, FIGS. 2 and 3 depict alternative embodiments of spray gun cup receptacles comprising more than one brace member disposed in a manner different from the embodiments of FIGS. 1A-1D. Alternatively, or in combination, a brace member could be provided to follow a trajectory whose brace member angle α varies as its position about the sidewall varies—e.g., a sinusoidal wave, a square wave, or a sawtooth pattern. Such waves or patterns could be repeating or irregular. Moreover, although the embodiments of spray gun cup receptacles depicted herein all show a generally circular cross-section, this need not be the case. For example, the cross-sectional shape of the spray gun cup receptacle at any given height may comprise a polygon such as a hexagon or octagon or any other shape that permits the functional purposes set forth herein to be realized. For example, in all cases the brace member will be shaped and disposed to enable visibility of the cavity as described elsewhere herein.

Figure 4A:
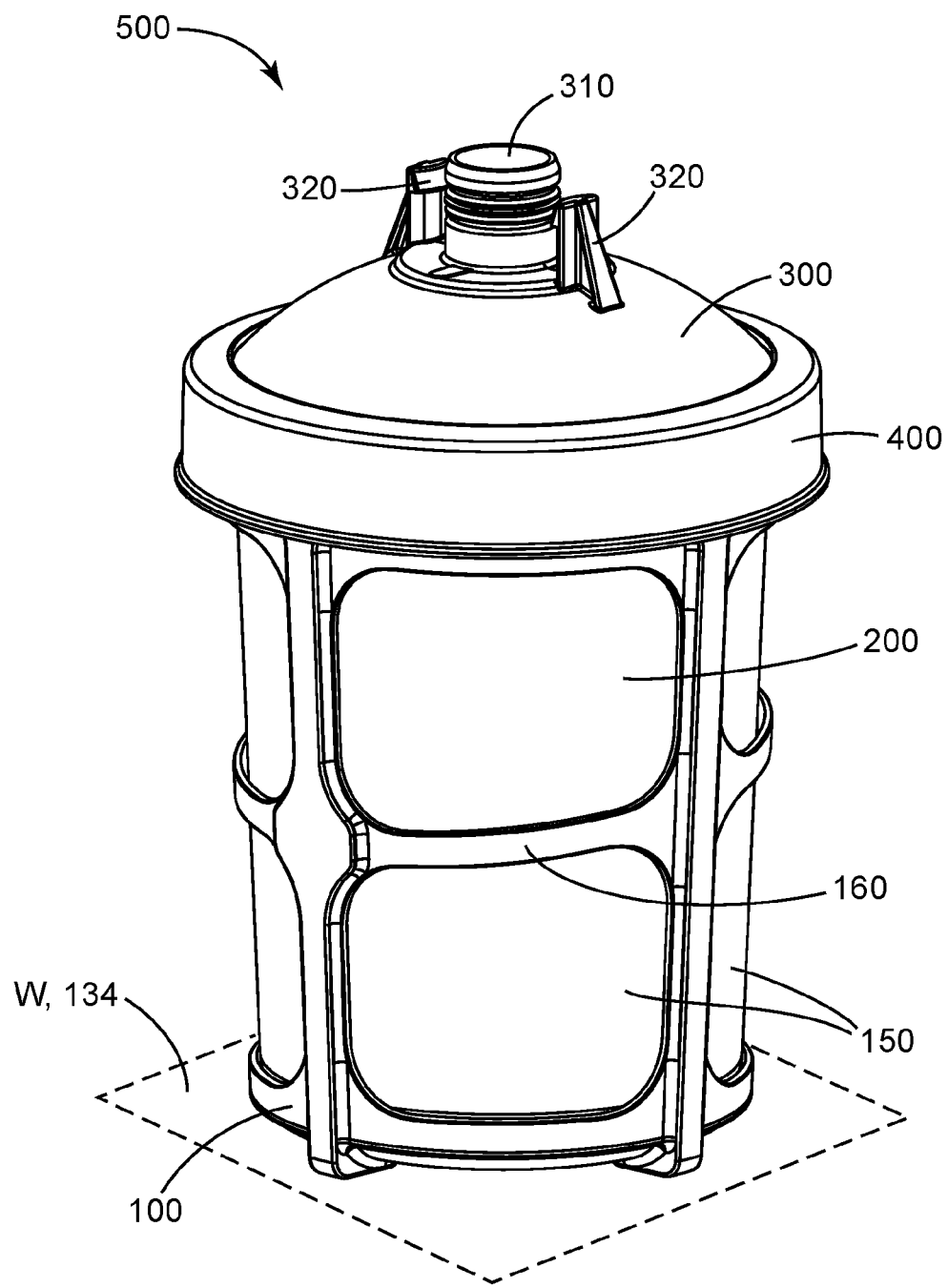
FIG. 4A is an isometric view of an embodiment of a spray gun cup according to the present disclosure.

FIG. 4A depicts a spray gun cup 500 comprising a spray gun cup receptacle 100 as shown, for example, in FIG. 1A. This embodiment includes a liner 200 positioned in the cavity of the spray gun cup receptacle. The liner 200 has an open end 210 (see FIGS. 4C-4D) corresponding to the open end of the spray gun cup receptacle. A lid member 300 is secured to the spray gun cup receptacle, to the liner, or to both. The lid member 300 can be secured in many ways. As shown in FIGS. 4A-4D, an optional collar 400 (cf. FIGS. 5A-5D) captures the lid member and the liner between the collar and the spray gun cup receptacle via collar connection structure 470—in this case screw threads. Any of the receptacle connection structures 170 earlier described may be used in similar fashion to permit an optional collar 400 to attach to the remainder of the spray gun cup. In addition, or in the alternative, the lid member 300 itself can be provided with lid connection structure 370 to compliment the collar connection structure 470. In such embodiments, for example, the collar 400 can be configured to attach from below the lid member 300 to capture the liner 200 between the lid member 300 and the collar 400. In such embodiments (and in other embodiments described herein) the spray gun cup receptacle may remain with the spray gun cup during spraying, or the lid, liner, and collar may be detached or removed from the spray gun cup receptacle 100 as a unit during spraying (in which case the spray gun cup receptacle 100 may be primarily used as a mixing vessel only).

As shown, the lid member 300 comprises a liquid outlet 310 and one or more outlet connection members 320 to permit the lid 300 to be connected to the liquid inlet of a spray gun. An outlet connection member 320 may be provided on, about, adjacent, or remote from, the liquid outlet 310 so long as it facilitates secure, liquid-tight connection to a spray gun. Optionally, the lid comprises a filter (not shown) to permit the liquid in the spray gun cup to be filtered prior to spraying.

Figure 4B:
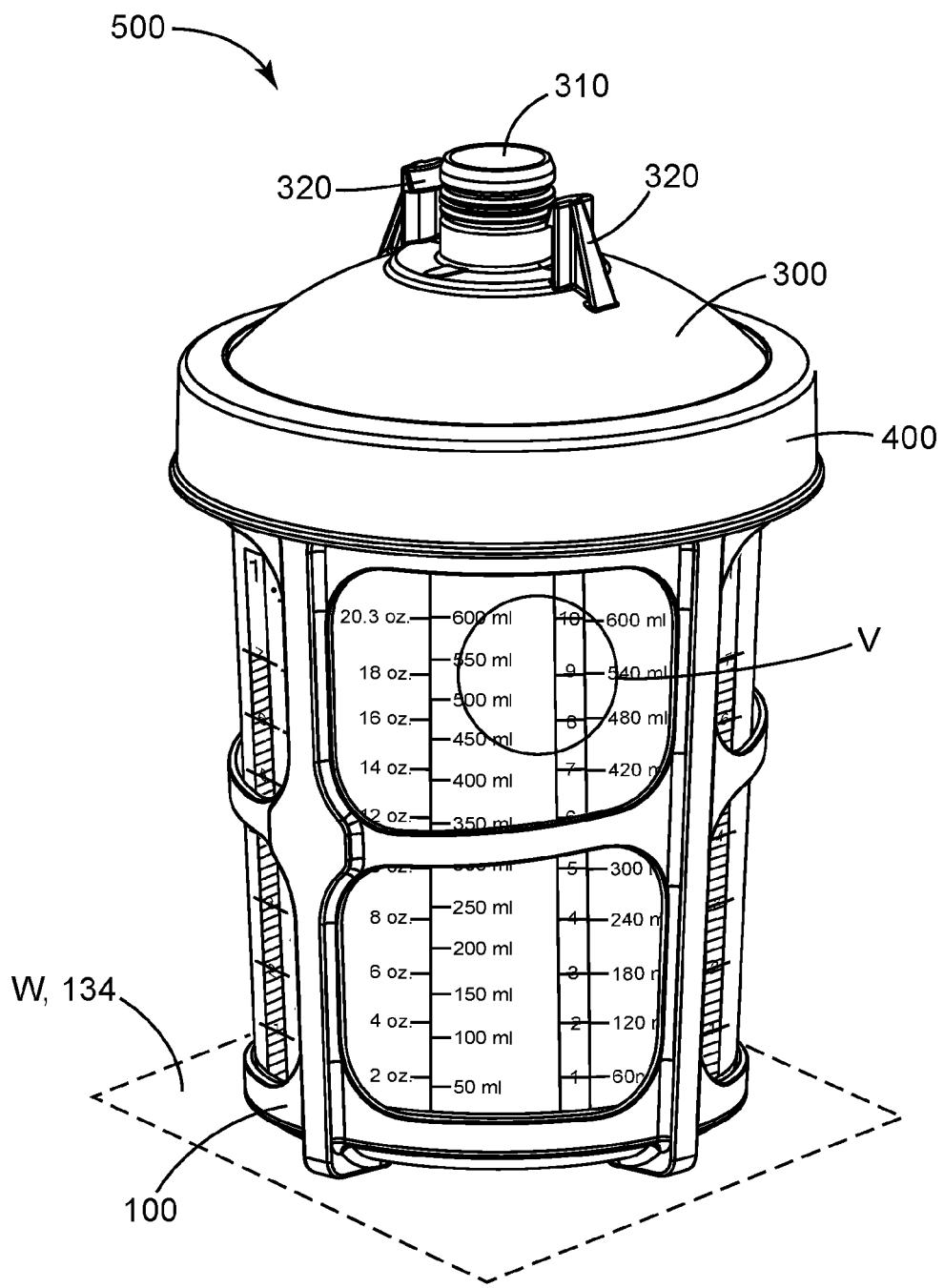
FIG. 4B is an isometric view of an embodiment of a spray gun cup including volumetric indicia according to the present disclosure.

FIG. 4B depicts an embodiment as in FIG. 4A further including volumetric indicia V as described elsewhere herein.

Figure 4C:
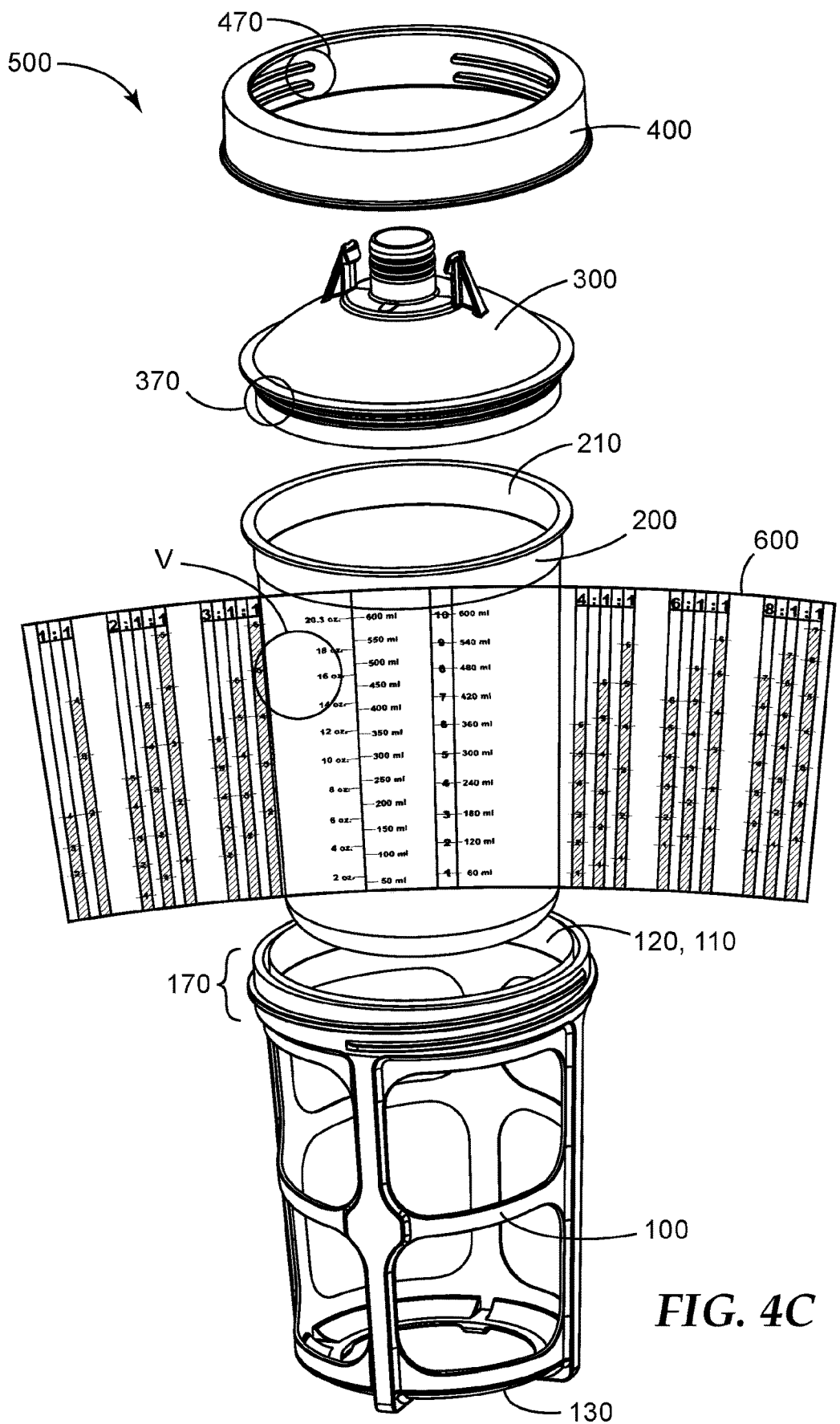
FIG. 4C is an exploded isometric view of an embodiment of a spray gun cup including an insert comprising volumetric indicia according to the present disclosure.

FIG. 4C depicts an exploded view of a spray gun cup 500 including volumetric indicia provided on an insert 600. As shown, it can be seen that the insert 600 may comprise a sheet that is deformable to the cavity of the spray gun cup receptacle upon insertion. Alternatively, an insert 600 could be provided as a pre-molded unit that could drop into the spray gun cup receptacle 100 without deformation.

An insert 600, or the corresponding receiving geometry of the spray gun cup receptacle 100, may be constructed such that the insert 600 is registered in the cavity and with respect to the apertures and thus generally fixed against rotation. In such an embodiment, the insert 600 may be provided as described above with repeating volumetric indicia "V" such that each liquid level is visible from at least one position about the spray gun cup receptacle. In some embodiments, the insert 600 may be registerable in more than one location such that the insert can be inserted and fixed in more than one position.

Figure 4D:
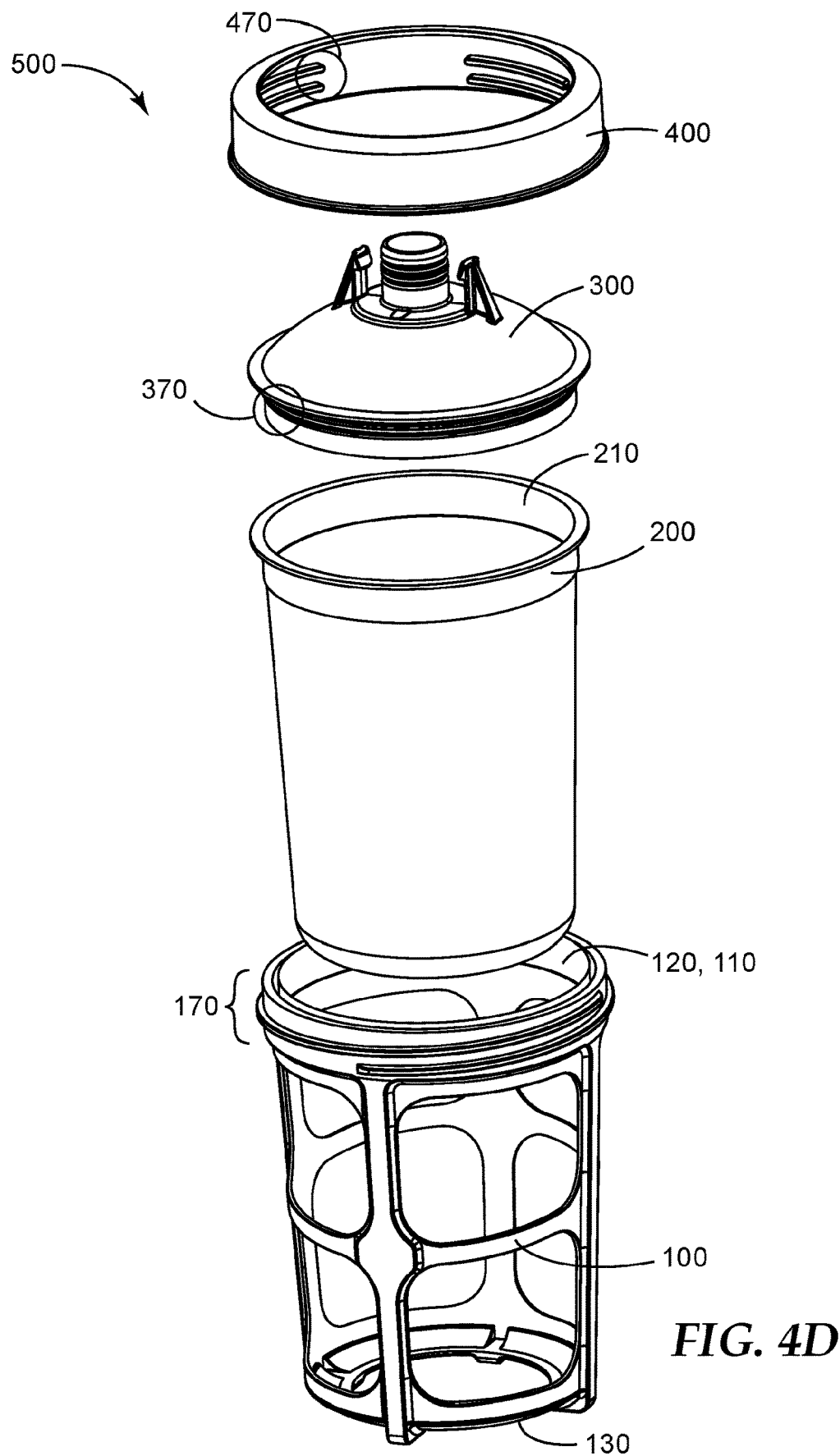
FIG. 4D is an exploded isometric view of an embodiment of a spray gun cup according to the present disclosure.

FIG. 4D depicts an exploded view of a spray gun cup 500 not including volumetric indicia V, but wherein the contents of the cavity are nonetheless visible at all fluid levels through at least one aperture as described elsewhere herein. In order that the contents of a liner 200—when provided— are visible, the liner is generally constructed from a transparent or translucent material.

Figure 5A:
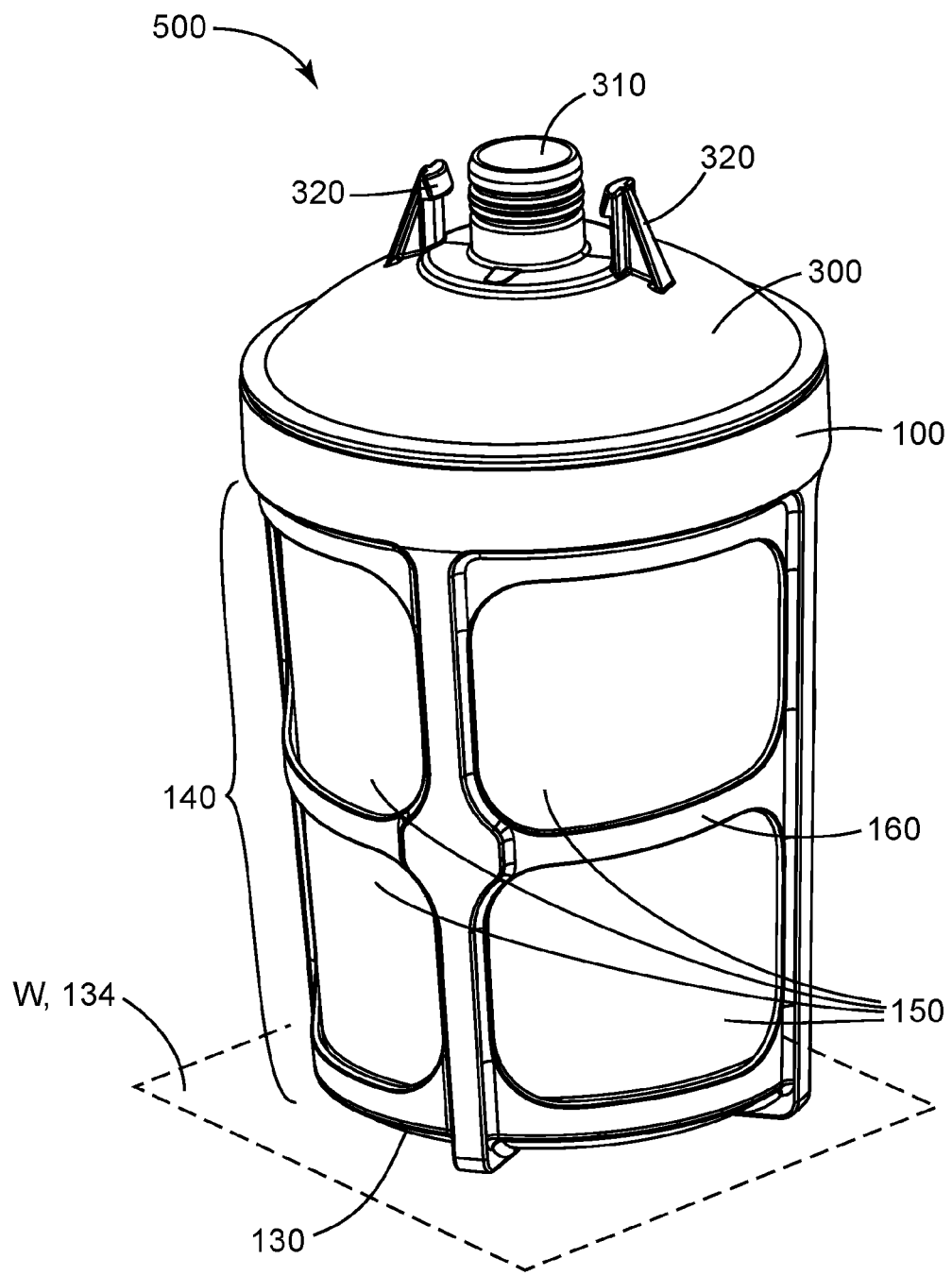
FIG. 5A is an isometric view of an embodiment of a spray gun cup according to the present disclosure.

FIG. 5A depicts a spray gun cup 500 different from the one depicted in FIG. 4A in that no collar 400 is used. Rather, the lid member 300 is adapted to be secured without the need of a collar. The lid member 300, while otherwise configured as described above, may be provided with lid connection structure 370 that may have alternatively been provided on a collar 400. For example, the lid member 300 may itself screw directly (via lid connection structure 370) into—or on to, or both—the spray gun cup receptacle 100. Alternatively (or in combination), the lid member 300 could comprise lid connection structure 370 to compliment receptacle connection structure 170 as previously discussed with respect to FIG. 1A (e.g., a snap-fit connection, a push-fit connection, a twist-lock connection, a clip connection, a latch connection, a hinged connection, or combinations thereof).

Figure 5B:
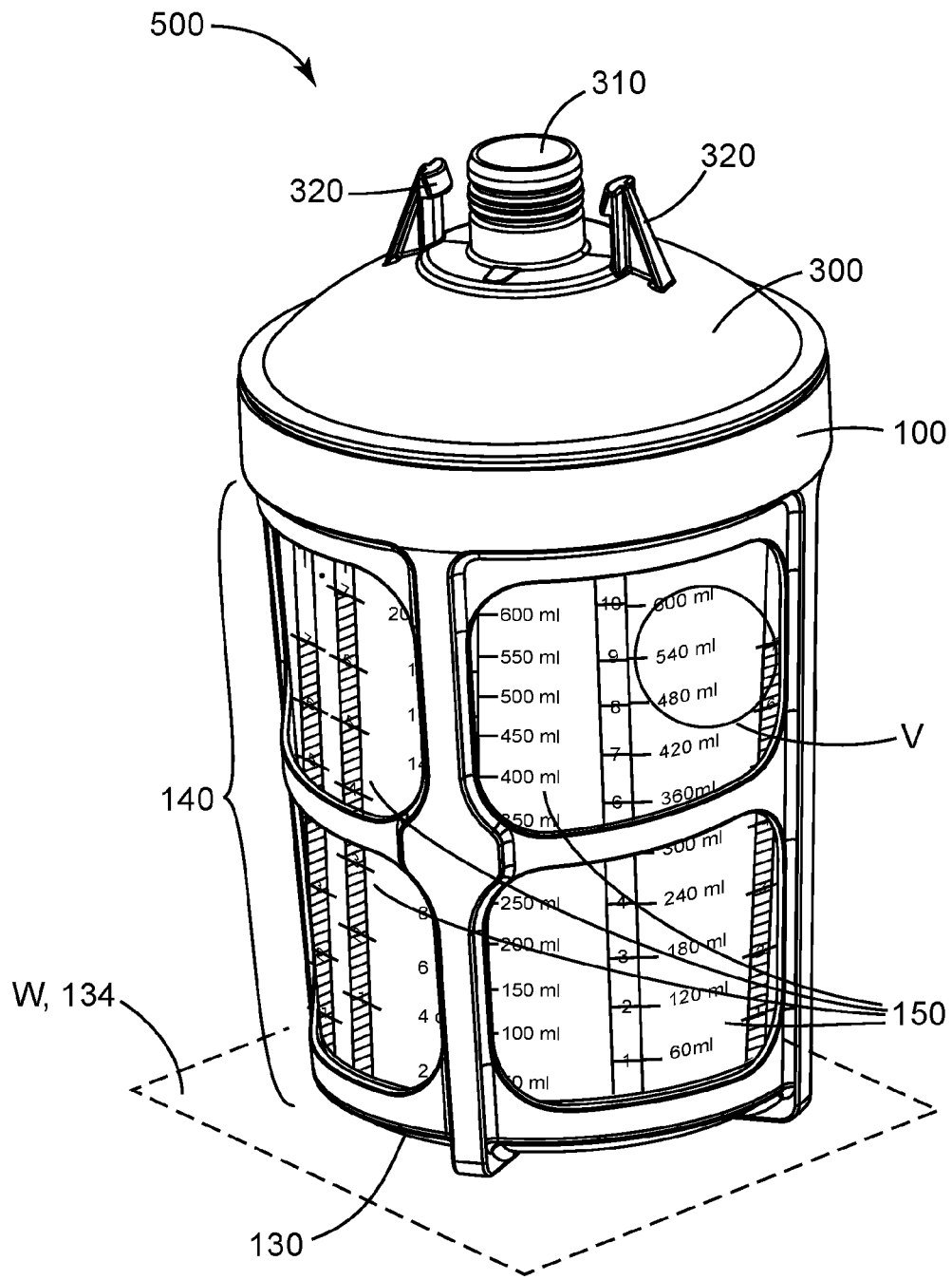
FIG. 5B is an isometric view of an embodiment of a spray gun cup including volumetric indicia according to the present disclosure.

FIG. 5B depicts an embodiment as in FIG. 5A further including volumetric indicia V as described elsewhere herein.

Figure 5C:
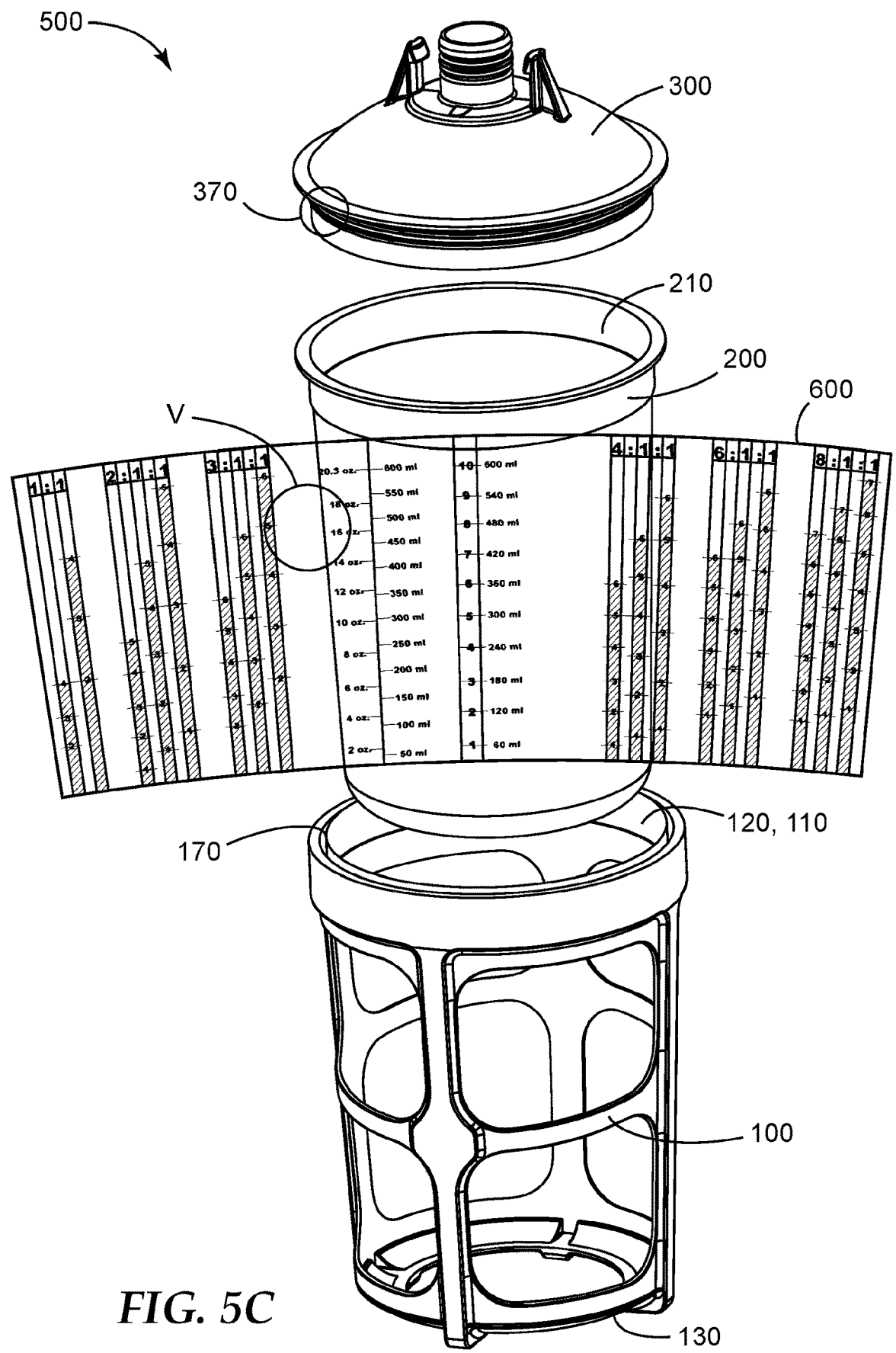
FIG. 5C is an exploded isometric view of an embodiment of a spray gun cup including an insert comprising volumetric indicia according to the present disclosure.

FIG. 5C depicts an exploded view of a spray gun cup 500 including volumetric indicia provided on an insert 600. As shown, it can be seen that the insert 600 may comprise a sheet that is deformable to the cavity of the spray gun cup receptacle 100 upon insertion. Alternatively, an insert 600 could be provided as a pre-molded unit that could drop into the spray gun cup receptacle 100 without deformation.

Figure 5D:
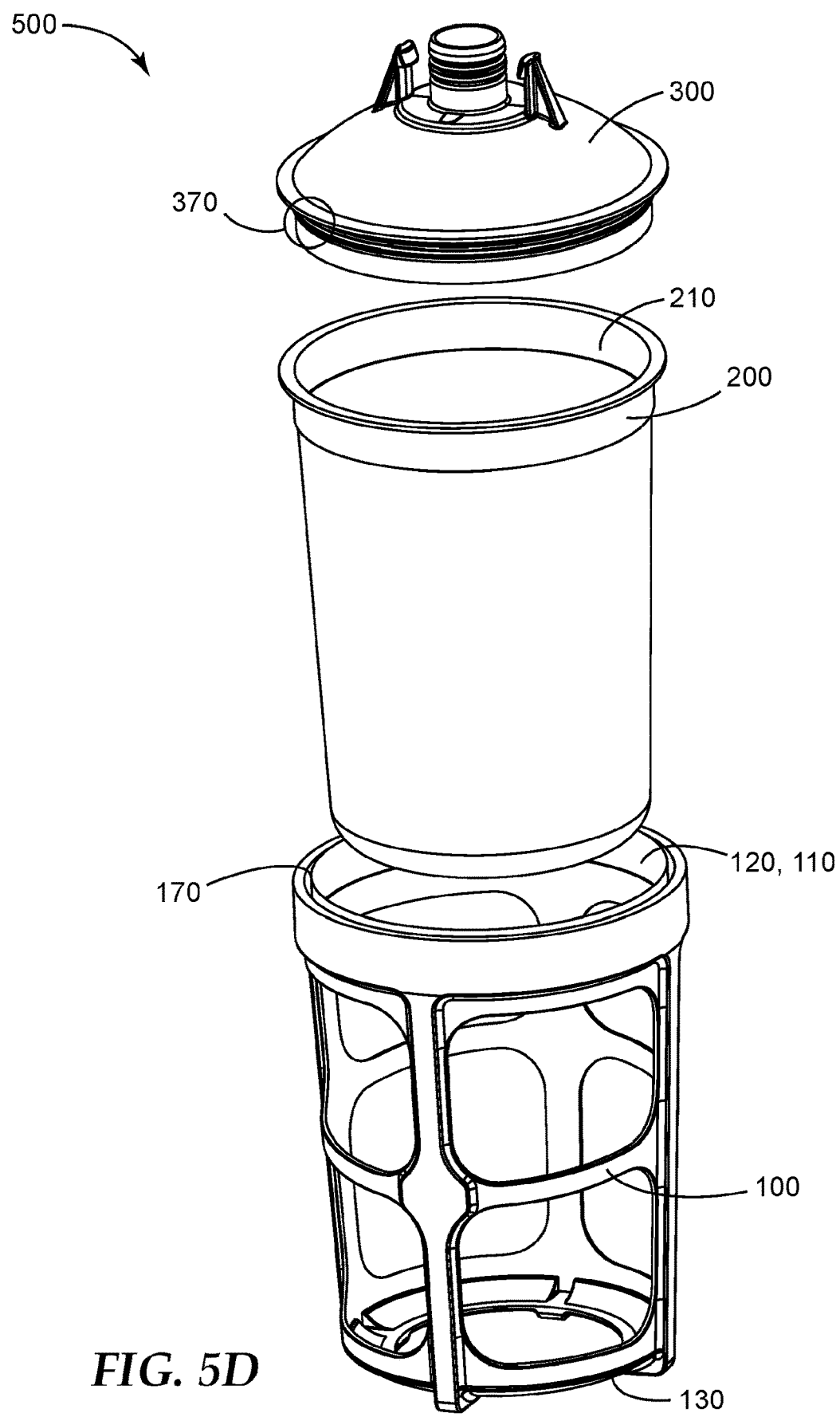
FIG. 5D is an exploded isometric view of an embodiment of a spray gun cup according to the present disclosure.

FIG. 5D depicts an exploded view of a spray gun cup 500 not including volumetric indicia, but wherein the contents of the cavity are nonetheless visible at all fluid levels through at least one aperture as described elsewhere herein. As shown in both FIGS. 5C and 5D, the lid connection structure 370 comprises a snap-fit connection with complimentary receptacle connection structure 170. In order that the contents of a liner 200—when provided—are visible, the liner is generally constructed from a transparent or translucent material.

It will be further appreciated that while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that aspects of the present disclosure, as generally described herein and illustrated in the figures, can be arranged, substituted, combined, separated, and designed in a wide variety of different combinations, all of which are contemplated herein.

What is claimed is:

1. A spray gun cup receptacle comprising
an open end for receiving a liner within a cavity;
a base end opposite the open end, the base end being positionable with respect to a work surface (W) with the open end facing upwards such that a base plane passing through the base end is parallel to the work surface;
a sidewall surrounding the cavity and connecting the open end to the base end, the sidewall comprising two apertures through which the cavity is visible from outside the spray gun cup receptacle, the two apertures being divided one above the other by a brace member, at least a portion of which is disposed at a brace member angle α relative to the base plane.

2. The spray gun cup receptacle of claim 1 wherein the brace member angle α is sufficient to render the cavity visible through at least one of the two apertures at any vertical position within the cavity.

3. The spray gun cup receptacle of claim 1 wherein the brace member defines a brace member trajectory (T) about the cavity, the brace member trajectory comprising a non-circular ellipse.

4. The spray gun cup receptacle of claim 1 wherein the brace member angle α is at least 2 degrees.

5. The spray gun cup receptacle of claim 1 wherein the brace member angle α is less than or equal to 30 degrees.

6. The spray gun cup receptacle of claim 1 wherein the open end comprises receptacle connection structure to permit a lid member to be secured to the open end.

7. The spray gun cup receptacle of claim 6 wherein the receptacle connection structure permits the lid member to be secured by one of: a threaded connection, helical wedge connection, a snap-fit connection, a push-fit connection, a twist-lock connection, a clip connection, a strap connection, or combinations thereof.

8. The spray gun cup receptacle of claim 1 wherein the sidewall comprises one or more generally vertical support members intersecting the brace member.

9. A spray gun cup comprising
a spray gun cup receptacle according to claim 1; and
a liner positioned in the cavity, the liner comprising an open end corresponding to the open end of the spray gun cup receptacle.

10. The spray gun cup of claim 9 comprising volumetric indicia (V) position to be visible through the apertures and indicate a volume of contents of the liner.

11. The spray gun cup of claim 10 wherein the volumetric indicia are on the liner.

12. The spray gun cup of claim 10 wherein the volumetric indicia are provided on an insert positioned between the spray gun cup receptacle and the liner.

13. The spray gun cup of claim 9 comprising a lid member secured to the open end of the spray gun cup receptacle.

14. The spray gun cup of claim 13 wherein the open end of the liner is secured by interaction of the lid member and the open end of the spray gun cup receptacle.

15. A method of using a spray gun cup comprising
positioning a spray gun cup receptacle according to claim 1 on a work surface;
inserting a liner into the open end of the spray gun cup receptacle;
adding a liquid to the liner; and
viewing the level of the liquid through an aperture in the sidewall of the spray gun cup receptacle.

16. The method of claim 15 comprising, prior to inserting the liner into the open end of the spray gun cup receptacle, inserting an insert comprising volumetric indicia into the open end of the spray gun cup receptacle.

17. The method of claim 16 comprising determining the volume of the liquid by viewing the volumetric indicia through the aperture.

18. The method according to claim 15 comprising adding additional liquid to the liner, and viewing the level of the combined liquids through an aperture in the sidewall of the spray gun cup receptacle.

19. The method according to claim 15 comprising securing a lid to the open end of the spray gun cup receptacle, the lid comprising a liquid outlet.

20. The method of claim 19 comprising attaching the liquid outlet to a spray gun.

\* \* \* \* \*